(12) United States Patent
Dailey

(10) Patent No.: US 11,422,349 B2
(45) Date of Patent: Aug. 23, 2022

(54) DUAL PROCESSOR IMAGE PROCESSING

(71) Applicant: Leica Biosystems Imaging, Inc., Vista, CA (US)

(72) Inventor: Timothy Dailey, San Diego, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 316 days.

(21) Appl. No.: 16/623,955

(22) PCT Filed: Nov. 28, 2018

(86) PCT No.: PCT/US2018/062905
§ 371 (c)(1),
(2) Date: Dec. 18, 2019

(87) PCT Pub. No.: WO2019/108691
PCT Pub. Date: Jun. 6, 2019

(65) Prior Publication Data
US 2020/0174242 A1    Jun. 4, 2020

Related U.S. Application Data

(60) Provisional application No. 62/591,418, filed on Nov. 28, 2017.

(51) Int. Cl.
*G02B 21/24* (2006.01)
*G02B 21/34* (2006.01)
*G02B 21/36* (2006.01)

(52) U.S. Cl.
CPC .......... *G02B 21/244* (2013.01); *G02B 21/34* (2013.01); *G02B 21/365* (2013.01)

(58) Field of Classification Search
CPC .. G02B 21/002; G02B 21/0036; G02B 21/34; G02B 21/244; G02B 21/245;
(Continued)

(56) References Cited

U.S. PATENT DOCUMENTS 5,966,204 A    10/1999  Abe
9,046,677 B2    6/2015  Tamura
(Continued)

FOREIGN PATENT DOCUMENTS

WO    2013165576 A1    11/2013
WO    2017053891 A1     3/2017

OTHER PUBLICATIONS

International Search Report and Written Opinion issued in International Application No. PCT/US2018/062905 dated Feb. 11, 2019 in 11 pages.

*Primary Examiner* — Mustak Choudhury
(74) *Attorney, Agent, or Firm* — Knobbe, Martens, Olson & Bear, LLP

(57) ABSTRACT

A digital slide scanning apparatus that includes a scanning stage, a focusing sensor, an imaging sensor, and at least two processors. A main processor is configured to control the scanning stage to move a sample relative to the focusing sensor and the imaging sensor. The main processor controls the secondary processor to process focus buffers generated by the focusing sensor and image buffers generated by the imaging sensor. The secondary processor access each buffer and processes the data in the buffer to generate an average contrast vector for the buffer. The average contrast vectors for the focus and image buffers are then provided to the main processor for further processing in connection with autofocus and/or generation of a digital slide image.

17 Claims, 2 Drawing Sheets

(58) Field of Classification Search
CPC .......... G02B 21/365; G02B 7/28; G01B 9/04; G06F 2209/509; G06F 2209/5017; H04N 1/40
See application file for complete search history.

(56) References Cited

U.S. PATENT DOCUMENTS

| | | | |
|---|---|---|---|
| 9,224,193 B2 * | 12/2015 | Tsujimoto | G06T 5/003 |
| 2004/0196365 A1 | 10/2004 | Green et al. | |
| 2005/0282292 A1 * | 12/2005 | Torre-Bueno | G01N 1/31 |
| | | | 436/180 |
| 2011/0115897 A1 | 5/2011 | Najmabadi et al. | |
| 2011/0141263 A1 * | 6/2011 | Olson | G02B 21/365 |
| | | | 348/79 |
| 2012/0189166 A1 | 7/2012 | Russo | |
| 2012/0275671 A1 * | 11/2012 | Eichhorn | G06T 7/0004 |
| | | | 382/128 |
| 2013/0229493 A1 | 9/2013 | Koji | |
| 2013/0300853 A1 | 11/2013 | Goodwin | |
| 2015/0062590 A1 | 3/2015 | Bagherinia | |
| 2015/0130920 A1 * | 5/2015 | Zou | G02B 21/245 |
| | | | 348/79 |

* cited by examiner

DUAL PROCESSOR IMAGE PROCESSING

CROSS-REFERENCE TO RELATED APPLICATIONS

This application claims priority to U.S. Provisional Patent App. No. 62/591,418, filed on Nov. 28, 2017, which is hereby incorporated herein by reference as if set forth in full.

BACKGROUND

Field of the Invention

The present invention generally relates to a digital slide scanning apparatus (e.g., for pathology) and, more particularly, relates to efficient real-time management of dual-processor resources during scanning of a sample by the digital slide scanning apparatus.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology exploded and is currently regarded as one of the most promising avenues of diagnostic medicine in order to achieve even better, faster and cheaper diagnosis, prognosis, and prediction of important diseases such as cancer.

In the digital pathology industry, there is a desire to scan a specimen on a glass slide as quickly as possible. In order to reduce scanning time, automatic focusing of the imaging system in real time is also desirable. However, when real-time autofocus is implemented, the processor of the digital slide scanning apparatus becomes overloaded, and this overloading adversely impacts scanning time. Therefore, what is needed is a system and method that overcomes these significant problems found in the conventional systems described above.

SUMMARY

Accordingly, to solve the problems identified above, described herein is a digital slide scanning apparatus that includes at least two processors. In an embodiment, the main processor of the scanning apparatus is a central processing unit (CPU) that is configured to control the overall scanning apparatus and scanning process. The CPU may also control the overall image processing and autofocus processes of the scanning apparatus. However, in an embodiment, certain specific image-analysis processing that is part of the autofocus process is offloaded from the CPU to a secondary processor, such as a graphics processing unit (GPU).

Advantageously, the CPU offloads certain processing intensive tasks to the GPU to increase the overall efficiency of the digital slide scanning apparatus. For example, if real-time autofocus requires processing of image data from both a focusing sensor and an imaging sensor, offloaded tasks may include processing each one-thousand scan-line buffer to generate an average contrast vector for the focusing sensor and processing each one-thousand scan-line buffer to generate an average contrast vector for the imaging sensor. Generating an average contrast vector may include determining the contrast value for each pixel in the scan line. Although the sensor may have 4,096 pixels, a scan line typically has 4,080 pixels. These contrast values may be determined for each pixel of each of the one-thousand scan lines in a buffer. Furthermore, each pixel column in the buffer (e.g., each of the one-thousand pixels in columns 1-4,080) may be averaged to a single value, and the combination of those average values may be used to compute the average contrast vector that is generated by the GPU and provided to the CPU. Additional tasks that are offloaded to the GPU may include color conversion to black and white and illumination correction, prior to generating the average contrast vector.

In an embodiment, a digital slide scanning apparatus comprises: an imaging system comprising a focusing sensor and an imaging sensor; a scanning stage configured to support a sample and move the sample relative to the focusing sensor and the imaging sensor; a main processor configured to control the scanning stage to generate image data from the focusing sensor and the imaging sensor; and a secondary processor configured to process image data, generated by the focusing sensor and the imaging sensor, under control of the main processor, by, for each of a focus buffer, comprising a plurality of scan lines generated by the focusing sensor, and an image buffer, comprising a plurality of scan lines generated by the imaging sensor, wherein each of the plurality of scan lines comprises a plurality of pixels, accessing the respective buffer, calculating an average contrast value for each pixel column in the plurality of scan lines of the respective buffer, wherein a pixel column comprises all pixels at a respective location across all of the plurality of scan lines in the respective buffer, and generating a respective contrast vector for the respective buffer, wherein the respective contrast vector comprises the average contrast value for each pixel column in the plurality of scan lines in the respective buffer, and returning both the contrast vector, generated from the focus buffer, and the contrast vector, generated from the image buffer, to the main processor for further processing. The main processor may generate both the focus buffer and the image buffer while controlling the scanning stage. The secondary processor may be further controlled by the main processor to, for each of the focus buffer and the image buffer, calculate an average contrast value for each pixel in the respective buffer, wherein the average contrast value for each pixel column in the plurality of scan lines of the respective buffer is calculated using the calculated average contrast values for the pixels in each pixel column. The average contrast value for each pixel may be calculated by averaging contrast values for that pixel and one or more pixels surrounding that pixel. The secondary processor may perform the processing of the image data, generated by the focusing sensor and the imaging sensor, in parallel with the main processor controlling the scanning stage to generate new image data from the focusing sensor and the imaging sensor. The main processor may the contrast vector, generated from one or both of the focus buffer and the image buffer, to generate a whole slide image of the sample supported on the scanning stage. The digital slide scanning apparatus may further comprise an objective lens configured to move along an axis that is perpendicular to a plane of the scanning stage, wherein the main processor uses the contrast vector, generated from one or both of the focus buffer and the image buffer, to automatically focus the objective lens.

In an embodiment, a method is disclosed in a digital slide scanning apparatus that comprises a focusing sensor, an imaging sensor, a scanning stage configured to support a sample and move the sample relative to the focusing sensor and the imaging sensor, a main processor, and a secondary processor. The method comprises: for each of a plurality of iterations, using the main processor to control the scanning stage to generate image data from the focusing sensor and the imaging sensor, wherein the image data comprises a focus buffer that comprises a plurality of scan lines generated by the focusing sensor, and an image buffer that comprises a plurality of scan lines generated by the imaging sensor, wherein each scan line comprises a plurality of pixels having respective locations in the scan line; and, in parallel with the main processors control of the scanning stage, using the secondary processor to process the image data by, for each of the focus buffer and the image buffer, accessing the respective buffer, calculating an average contrast value for each pixel column in the plurality of scan lines of the respective buffer, wherein a pixel column comprises all pixels at a respective location across all of the plurality of scan lines in the respective buffer, and generating a respective contrast vector for the respective buffer, wherein the respective contrast vector comprises the average contrast value for each pixel column in the plurality of scan lines in the respective buffer, and returning both the contrast vector, generated from the focus buffer, and the contrast vector, generated from the image buffer, to the main processor for further processing.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for off-loading of specific image-processing tasks from a main processor to a secondary processor in order to accomplish real-time autofocus in a digital slide scanning apparatus. As used herein, the adjective "real-time" should be understood to refer to near real-time, as well as real-time, and the noun "real time" should be understood to refer to near real time, as well as real time, respectively. After reading this description, it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. Dual Processors

Figure 1:
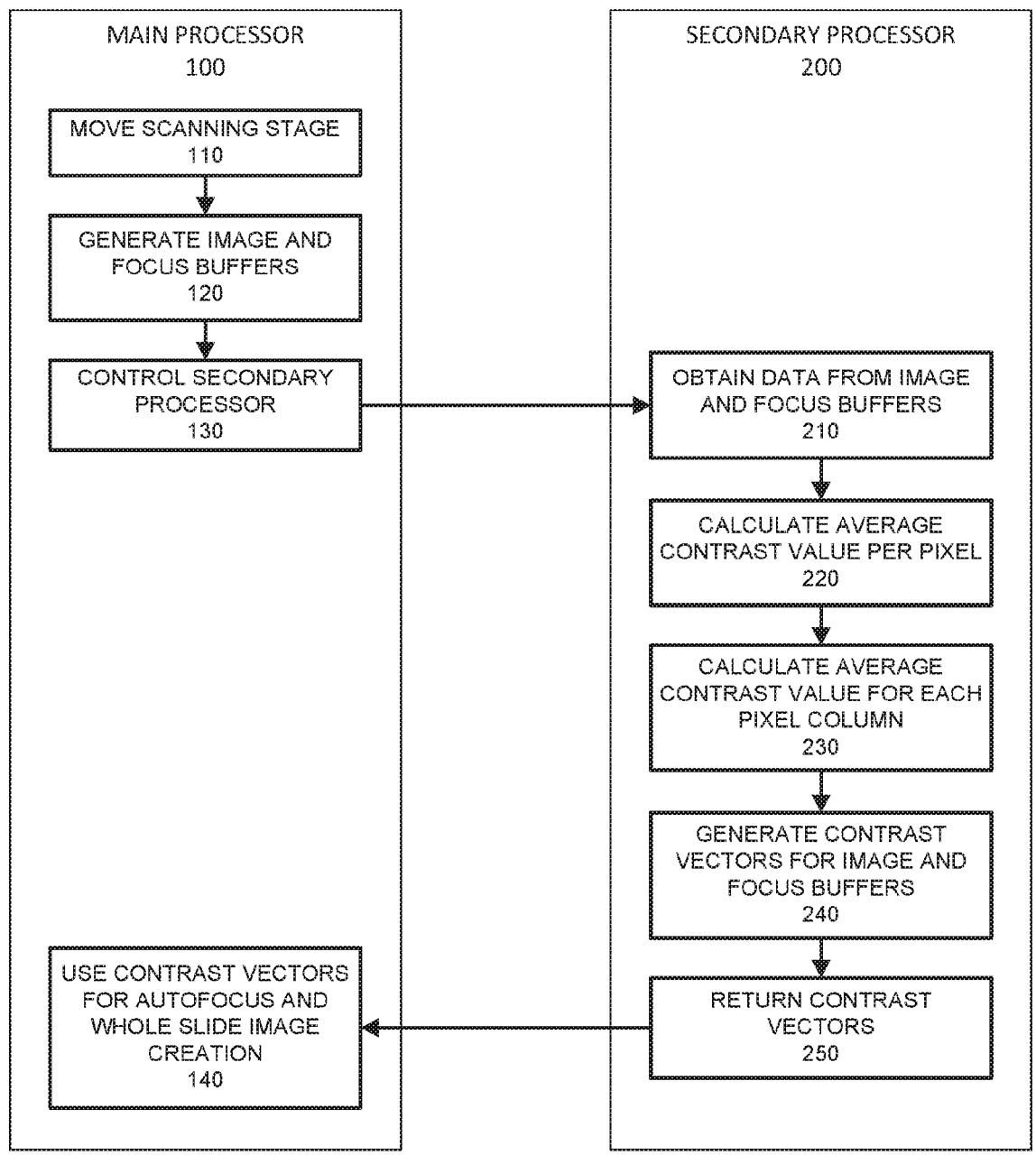
FIG. 1 is a flow diagram illustrating an example process for dual-processor image processing, according to an embodiment.

FIG. 1 is a flow diagram illustrating an example process for dual-processor image processing, according to an embodiment. The illustrated process may be carried out by a main processor 100 and a secondary processor 200 within a digital slide scanning apparatus (e.g., as processor 555), as later described with respect to FIGS. 2A-2D.

Initially, the digital slide scanning apparatus employs its main processor 100 to execute step 110 to move the scanning stage (e.g., stage 580) relative to an imaging system that comprises a focusing sensor, an imaging sensor, and a single objective lens (e.g., objective lens 600). At least a portion of a field of view (e.g., field of view 625) of the objective lens is provided to the focusing sensor, via an optical path (e.g., optical path 605) from the objective lens to the focusing sensor. In addition, at least a portion of the field of view of the objective lens is provided to the imaging sensor, via an optical path from the objective lens to the imaging sensor. In an embodiment, the focusing sensor and imaging sensor are each linear sensors that each produce lines of image data referred to as scan lines. Thus, the focusing sensor and the imaging sensor each produce a plurality of scan lines representing image data of their respective received fields of view.

In step 120, the main processor 100 generates a focus buffer comprising the plurality of scan lines produced by the focusing sensor, and generates an image buffer comprising the plurality of scan lines producing by the imaging sensor. In the described embodiment, each buffer is assumed to comprise 1,000 scan lines, with each scan line comprising 4,080 pixels. However, each buffer may comprise more or fewer scan lines, and/or each scan line may comprise more or fewer pixels.

In step 130, once the focus buffer and image buffer have been generated in step 120, the main processor 100 controls the secondary processor 200 to processor the focus and image buffers. This allows the main processor 100 to continue control of the overall scan process, including the continuous movement of the scanning stage relative to the imaging system (i.e., in subsequent iterations of step 110) and the generation of additional focus buffers and image buffers (i.e., in subsequent iterations of step 120).

In parallel to this continuous control of the overall scan process by the main processor 100, the secondary processor 200 obtains image data from the image buffer and the focus buffer in step 210. In the described example, the image data in each buffer comprises 1,000 scan lines, with each scan line comprising 4,080 individual pixels that are indexed along a scan line at respective positions corresponding to a pixel on the respective sensor. For example, a buffer may be described as a table of pixels comprising 1,000 rows, with each row corresponding to one scan line produced by the respective sensor, and 4,080 columns, with each column corresponding to a respective pixel on the respective sensor.

In step 220, once the data for a given buffer has been obtained (e.g., a focus buffer or an image buffer), the secondary processor 200 calculates an average contrast value for each pixel in each buffer. In an embodiment, this may be accomplished by averaging the contrast values of the target pixel and its surrounding pixels. Alternatively, step 220 may be omitted.

In step 230, the secondary processor 200 calculates an average contrast value for each column in each buffer. In an embodiment in which each buffer comprises 1,000 scan lines and each scan line comprises 4,080 pixels, step 230 may comprise calculating an average pixel contrast value based on the original contrast value (in an embodiment in which step 220 is omitted) or the average contrast value (in an embodiment in which step 220 is performed) for each of the 1,000 pixels in a given column in each buffer. For each buffer, this calculation is performed 4,080 times.

In step 240, the secondary processor generates a contrast vector for each buffer. Each contrast vector comprises the average contrast value, calculated in step 230, for each of the 4,080 pixel columns in the respective buffer. Then, in step 250, the contrast vector for the focus buffer and the contrast vector for the image buffer are returned to the main processor 100 for further processing.

In step 140, the main processor 100 uses the contrast vector for the focus buffer and the contrast vector for the image buffer, returned by the secondary processor 200 in step 250, in an autofocus process for focusing the objective lens and in generating a whole slide image of the sample (e.g., sample 590) on the scanning stage.

2. Example Embodiments

In an embodiment, a digital slide scanning apparatus includes an imaging system comprising a focusing sensor and an imaging sensor, a scanning stage configured to support a sample and move the sample relative to the focusing sensor and the imaging sensor, a main processor configured to control the scanning stage and control the processing of image data generated by the focusing sensor and the imaging sensor, and a secondary processor configured to process image data generated by the focusing sensor and the imaging sensor under control of the main processor. In this embodiment, the secondary processor is controlled by the main processor to process individual buffers of image data generated by the focusing sensor and the imaging sensor. Specifically, the secondary processor is controlled by the main processor to obtain a focus buffer comprising a plurality of scan lines generated by the focusing sensor, wherein each scan line comprises a plurality of pixels, calculate an average contrast value for each pixel column in the focus buffer, wherein a pixel column comprises all pixels at a respective location across all scan lines in the focus buffer, and generate a focus contrast vector for the focus buffer, the focus contrast vector comprising the average contrast value for each pixel column in the focus buffer.

The secondary processor is also controlled by the main processor to obtain an image buffer comprising a plurality of scan lines generated by the imaging sensor, wherein each scan line comprises a plurality of pixels, calculate an average contrast value for each pixel column in the image buffer, wherein a pixel column comprises all pixels at a respective location across all scan lines in the image buffer, and generate an image contrast vector for the image buffer, the image contrast vector comprising the average contrast value for each pixel column in the focus buffer.

Advantageously, for each focus buffer of image data that is processed by the secondary processor, the secondary processor returns the focus contrast vector to the main processor. Additionally, for each image buffer of image data that is processed by the secondary processor, the secondary processor returns the image contrast vector to the main processor. The average contrast vector for the focus buffer and the average contrast vector for the image buffer are subsequently used by the main processor for real-time autofocus and/or for the management of the overall scanning process.

In an embodiment, a digital slide scanning apparatus having a focusing sensor, an imaging sensor, a scanning stage configured to support a sample and move the sample relative to the focusing sensor and the imaging sensor, a main processor, and a secondary processor, is configured to carry out a method for real-time autofocus. The method for real-time autofocus includes using the main processor to control the scanning stage and move a sample supported by the scanning stage relative to the focusing sensor and the imaging sensor. The method also includes generating a plurality of focus buffers by the focusing sensor, wherein each focus buffer comprises a plurality of scan lines generated by the focusing sensor, wherein each scan line generated by the focusing sensor comprises a plurality of pixels having respective locations in the scan line. The method also includes generating a plurality of image buffers by the imaging sensor, wherein each image buffer comprises a plurality of scan lines generated by the imaging sensor, wherein each scan line generated by the imaging sensor comprises a plurality of pixels having respective locations in the scan line.

In addition, the method includes using a secondary processor to process image data in the plurality of focus buffers generated by the focusing sensor and the plurality of image buffers generated by the imaging sensor. The processing by the secondary processor includes obtaining a focus buffer comprising a plurality of scan lines generated by the focusing sensor, wherein each scan line comprises a plurality of pixels, calculating an average contrast value for each pixel column in the focus buffer, wherein a pixel column comprises all pixels at a respective location across all scan lines in the focus buffer, and generating a focus contrast vector for the focus buffer, the focus contrast vector comprising the average contrast value for each pixel column in the focus buffer. The processing by the secondary processor also includes obtaining an image buffer comprising a plurality of scan lines generated by the imaging sensor, wherein each scan line comprises a plurality of pixels, calculating an average contrast value for each pixel column in the image buffer, wherein a pixel column comprises all pixels at a respective location across all scan lines in the image buffer, and generating an image contrast vector for the image buffer, the image contrast vector comprising the average contrast value for each pixel column in the image buffer. The processing by the secondary processor additionally includes returning the focus contrast vector for the focus buffer and the image contrast vector for the image buffer to the main processor for further processing.

3. Example Digital Slide Scanning Apparatus

Figure 2A:
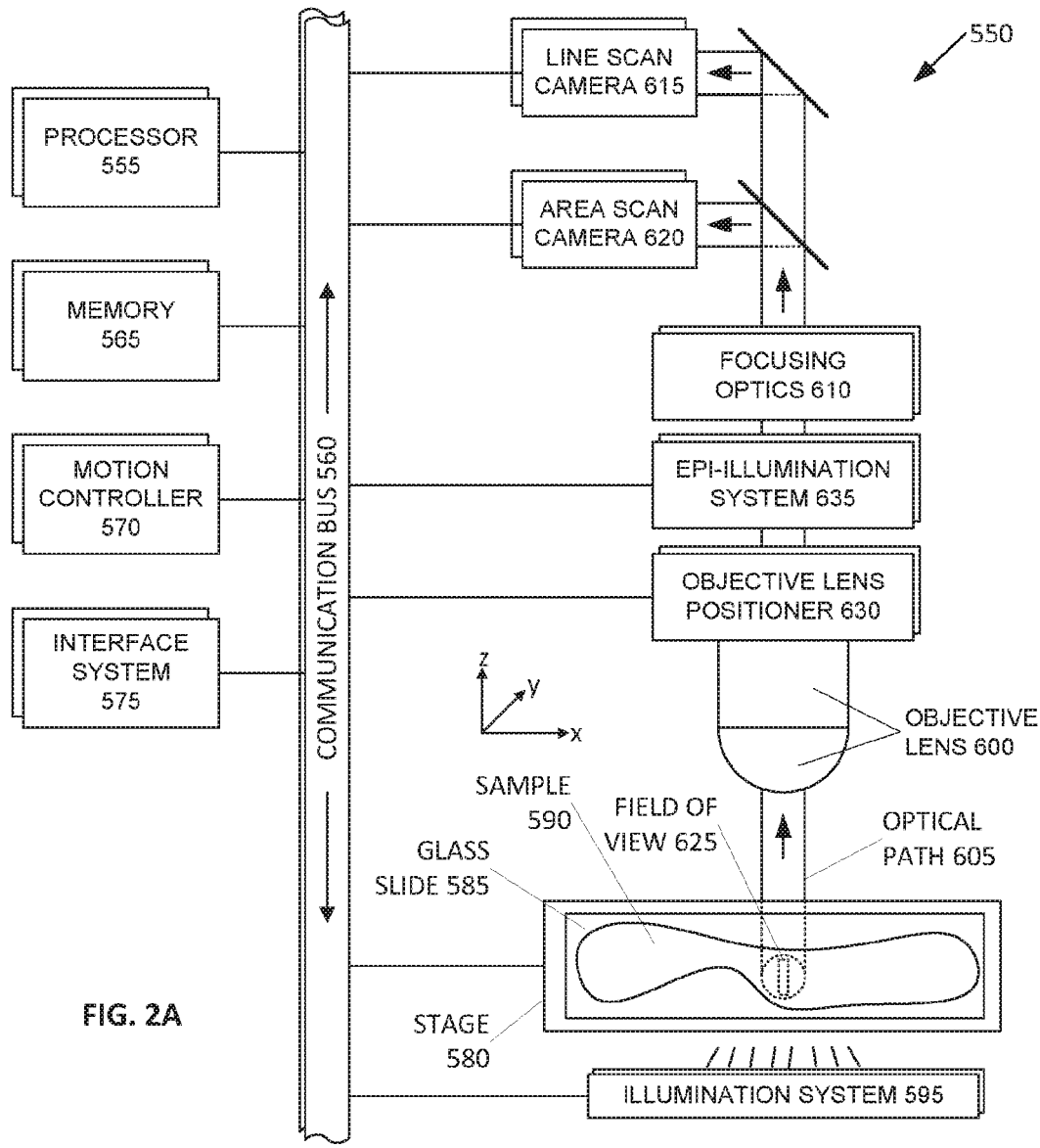
FIG. 2A is a block diagram illustrating an example processor-enabled device that may be used in connection with various embodiments described herein.

FIG. 2A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system, a scanning system, a digital slide scanning apparatus, a scanning apparatus, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence-based scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity, these elements will be described in the singular except when needed to be described in the plural to convey the appropriate information.

The one or more processors 555 may include, for example, the main processor 100 (e.g., CPU) and the secondary processor 200 (e.g., a separate GPU). The main processor 100 and secondary processor 200 are advantageously capable of processing instructions in parallel. In an embodiment, the one or more processors 555 may include a multi-core processor capable of processing instructions in parallel, where a first core of the multi-core processor may be considered as the main processor 100 and a second core of the multi-core processor may be considered as the secondary processor 200. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal-processing algorithms (e.g., digital-signal processor), a slave processor subordinate to the main processor 100 (e.g., back-end processor), and/or an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and persistent computer-readable storage media that store the data and instructions, including, without limitation, a random access memory, a read only memory, a hard disk drive, removable storage drive, and/or the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575, via the one or more communication busses 560, may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X-Y-Z movement of the stage 580 and/or the objective lens 600 (e.g., via the objective lens positioner 630). In an embodiment, the stage 580 is capable of movement along X and Y axes, while the objective lens 600 is capable of movement along a Z axis. The motion control system 570 is also configured to control movement of any other moving part in the scanner system 550. For example, in a fluorescence-based scanner embodiment, the motion control system 570 is configured to coordinate movement of optical filters and the like in the epi-illumination system 635.

In an embodiment, the interface system 575 allows the scanner system 550 to interface with other systems and human operators. For example, the interface system 575 may include a user interface to provide information directly to an operator and/or to allow direct input from an operator. The interface system 575 may also be configured to facilitate communication and data transfer between the scanning system 550 and one or more external devices that are directly connected (e.g., a printer, removable storage medium, etc.) or external devices such as an image server system, an operator station, a user station, an administrative server system, and/or the like that are connected to the scanner system 550 via a network (not shown).

The illumination system 595 is configured to illuminate a portion of the sample 590. The illumination system may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively, or in combination, the illumination system 595 may be configured to illuminate the sample 590 in reflection mode such that the line scan camera 615 and/or area scan camera 620 sense optical energy that is reflected from the sample 590. More generally, the illumination system 595 may be configured to be suitable for interrogation of the microscopic sample 590 in any known mode of optical microscopy.

In an embodiment, the scanner system 550 includes an epi-illumination system 635 to optimize the scanner system 550 for fluorescence-based scanning. Fluorescence-based scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, a fluorescence-based embodiment of the scanner system 550 uses a line scan camera 615 that includes multiple linear sensor arrays (e.g., a time delay integration ("TDI") line scan camera) and increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence-based scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence-based scanner embodiment, a line scan camera 615 used in the fluorescence-based scanning system 550 is a monochrome 10-bit 64-linear-array TDI line scan camera. It should be noted that a variety of bit depths for the line scan camera 615 can be employed for use with a fluorescence-based scanner embodiment of the scanning system 550.

The movable stage 580 is configured for precise X-Y movement under control of the processor 555 or the motion controller 570. The movable stage may also be configured for movement along a Z axis under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. The scanner system 550 may employ a high-precision and tightly coordinated X-Y grid to aid in the location of the sample 590 on the movable stage 580. In an embodiment, the movable stage 580 is a linear-motor-based X-Y stage with high precision encoders employed on both the X and the Y axes. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA, RNA, or protein that is deposited on any type of slide or other substrate, including any and all samples commonly known as a microarrays. The sample 590 may be a microtiter plate (e.g., a 96-well plate). Other examples of the sample 590 include integrated circuit boards, electrophoresis records, petri dishes, film, semiconductor materials, forensic materials, and machined parts.

Objective lens 600 is mounted on the objective positioner 630 which, in an embodiment, employs a very precise linear motor to move the objective lens 600 along the optical axis defined by the objective lens 600. For example, the linear motor of the objective lens positioner 630 may include a 50-nanometer encoder. The relative positions of the stage 580 and the objective lens 600 in X, Y, and Z axes are coordinated and controlled in a closed-loop manner using motion controller 570 under the control of the processor 555 (e.g., main processor 100) that employs memory 565 for storing information and instructions, including the computer-executable programmed steps for overall scanning system 550 operation.

In an embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal, captured by the objective lens 600, onto the light-responsive elements of the line scan camera 615 and/or the area scan camera 620 and may include optical components such as filters, magnification changer lenses, and/or the like. The objective lens 600, combined with focusing optics 610, provides the total magnification for the scanning system 550. In an embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a three linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1,024 pixels, and others having as many as 4,096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615, so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555, and the revised contiguous digital image can also be stored in the memory 565.

In an embodiment with two or more line scan cameras 615, at least one of the line scan cameras 615 can be configured to function as the focusing sensor that operates in combination with at least one of the line scan cameras 615 that is configured to function as the imaging sensor. The focusing sensor can be logically positioned on the same optical axis as the imaging sensor or the focusing sensor may be logically positioned before or after the imaging sensor with respect to the scanning direction of the scanner system 550. In an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment, the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitization of the sample 590, which is disposed on a glass slide 585. The glass slide 585 is securely placed on the movable stage 580 of the scanner system 550 for scanning the sample 590. Under control of the processor 555 (e.g., main processor 100), the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image stripe. A plurality of adjacent image stripes are similarly combined to form a contiguous digital image of a portion of the sample 590 or the entire sample 590. The scanning of the sample 590 may include acquiring vertical image stripes or horizontal image stripes. The scanning of the sample 590 may be either top-to-bottom, bottom-to-top, or both (bi-directional) and may start at any point on the sample 590. Alternatively, the scanning of the sample 590 may be either left-to-right, right-to-left, or both (bi-directional) and may start at any point on the sample 590. Additionally, it is not necessary that image stripes be acquired in an adjacent or contiguous manner. Furthermore, the resulting image of the sample 590 may be an image of the entire sample 590 or only a portion of the sample 590.

In an embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer-executable instructions to the scanning system 550 for execution by the processor 555 (e.g., main processor 100 and/or secondary processor 200). Examples of these media include memory 565 and any removable or external storage medium (not shown) communicatively coupled with the scanning system 550 either directly or indirectly, for example via a network (not shown).

Figure 2B:
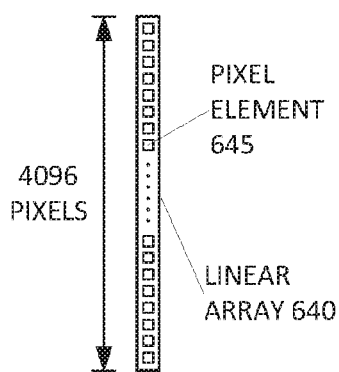
FIG. 2B is a block diagram illustrating an example line-scan camera having a single linear array, according to an embodiment.

FIG. 2B illustrates a line scan camera 615 having a single linear array 640, which may be implemented as a charge coupled device (CCD) array. The single linear array 640 comprises a plurality of individual pixels 645. In the illustrated embodiment, the single linear array 640 has 4,096 pixels. In an alternative embodiment, linear array 640 may have more or fewer pixels. For example, common formats of linear arrays include 512, 1,024, and 4,096 pixels. The pixels 645 are arranged in a linear fashion to define a field of view 625 for the linear array 640. The size of the field of view varies in accordance with the magnification of the scanner system 550.

Figure 2C:
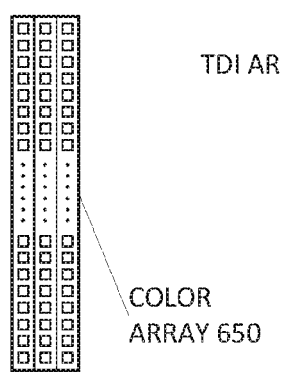
FIG. 2C is a block diagram illustrating an example line-scan camera having three linear arrays, according to an embodiment.

FIG. 2C illustrates a line scan camera having three linear arrays, each of which may be implemented as a CCD array. The three linear arrays combine to form a color array 650. In an embodiment, each individual linear array in the color array 650 detects a different color intensity (e.g., red, green, or blue). The color image data from each individual linear array in the color array 650 is combined to form a single field of view 625 of color image data.

Figure 2D:
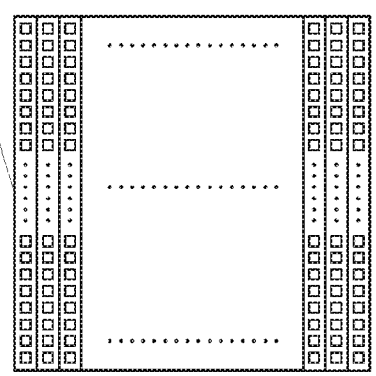
FIG. 2D is a block diagram illustrating an example line-scan camera having a plurality of linear arrays, according to an embodiment.

FIG. 2D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example, common formats of TDI line scan cameras include 24, 32, 48, 64, 96, 120, and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital slide scanning apparatus comprising:
   a focusing sensor;
   an imaging sensor;
   a main processor configured to:
   control a scanning stage configured to support a sample and move the sample relative to the focusing sensor and the imaging sensor, and
   generate first image data from the focusing sensor and second image data from the imaging sensor; and
   a secondary processor configured to, in parallel with the main processor controlling the scanning stage during scanning of the sample:
   receive the first image data from the focusing sensor and the second image data from the imaging sensor,
   for each of: i) a focus buffer comprising a plurality of scan lines of the first image data generated by the focusing sensor, and ii an image buffer comprising a plurality of scan lines of the second image data generated by the imaging sensor, wherein each of the plurality of scan lines comprises a plurality of pixels,
access the respective buffer,
determine an average contrast value for each pixel column in the plurality of scan lines of the respective buffer, wherein a pixel column comprises all pixels at a respective location across all of the plurality of scan lines in the respective buffer,
generate a set of average contrast values for the respective buffer comprising the average contrast value for each pixel column in the plurality of scan lines in the respective buffer, and
returning both a first set of average contrast values generated from the focus buffer, and a second set of average contrast values generated from the image buffer, to the main processor for further processing.

2. The digital slide scanning apparatus of claim 1, wherein the main processor is further configured to generate both the focus buffer and the image buffer while controlling the scanning stage.

3. The digital slide scanning apparatus of claim 1, wherein the secondary processor is further configured to for each of the focus buffer and the image buffer, determine an average contrast value for each pixel in the respective buffer, and wherein the average contrast value for each pixel column in the plurality of scan lines of the respective buffer is determined using the determined average contrast values for the pixels in each pixel column.

4. The digital slide scanning apparatus of claim 3, wherein the average contrast value for each pixel is determined by averaging contrast values for that pixel and one or more pixels surrounding that pixel.

5. The digital slide scanning apparatus of claim 1, wherein the secondary processor generates the sets of average contrast values in parallel with the main processor controlling the scanning stage to generate new image data from the focusing sensor and the imaging sensor.

6. The digital slide scanning apparatus of claim 1, further comprising an objective lens configured to move along an axis that is perpendicular to a plane of the scanning stage, wherein the main processor is further configured to use the contrast value, determined from one or both of the focus buffer and the image buffer, to automatically focus the objective lens.

7. The digital slide scanning apparatus of claim 1, wherein the main processor is further configured to use the contrast value, generated from one or both of the focus buffer and the image buffer, to generate a whole slide image of the sample supported on the scanning stage.

8. A method in a digital slide scanning apparatus that comprises a focusing sensor, an imaging sensor, a scanning stage configured to support a sample and move the sample relative to the focusing sensor and the imaging sensor, a main processor, and a secondary processor, the method comprising:
controlling the scanning stage, via the main processor, to generate first image data from the focusing sensor and second image data from the imaging sensor, wherein a focus buffer comprises a plurality of scan lines of the first image data generated by the focusing sensor, and an image buffer comprises a plurality of scan lines of the second image data generated by the imaging sensor, wherein each scan line comprises a plurality of pixels having respective locations in the scan line; and
in parallel with the main processor controlling the scanning stage during scanning of the sample, for each of the focus buffer and the image buffer,
accessing the respective buffer with the secondary processor,
determining, via the secondary processor, an average contrast value for each pixel column in the plurality of scan lines of the respective buffer, wherein a pixel column comprises all pixels at a respective location across all of the plurality of scan lines in the respective buffer,
generating, via the secondary processor, a respective contrast values for the respective buffer comprising the average contrast value for each pixel column in the plurality of scan lines in the respective buffer, and
returning, via the secondary processor, a first set of average contrast values generated from the focus buffer, and a second set of average contrast values generated from the image buffer, to the main processor for further processing.

9. The method of claim 8, further comprising:
generating, via the main processor, both the focus buffer and the image buffer while controlling the scanning stage.

10. The method of claim 8, further comprising:
for each of the focus buffer and the image buffer, the secondary processor determining an average contrast value for each pixel in the respective buffer, and the second processor determining the average contrast value for each pixel column in the plurality of scan lines of the respective buffer is using the determined average contrast values for the pixels in each pixel column.

11. A non-transitory computer-readable medium having stored thereon instructions that, when executed by a main processor, cause the main processor to:
control a scanning stage configured to support a sample and move the sample relative to a focusing sensor and an imaging sensor;
generate first image data from the focusing sensor and second image data from the imaging sensor; and
in parallel with the main processor controlling the scanning stage during scanning of the sample, controlling a secondary processor to:
receive the first image data from the focusing sensor and the second image data from the imaging sensor,
for each of: i) a focus buffer comprising a plurality of scan lines of the first image data generated by the focusing sensor, and ii) an image buffer comprising a plurality of scan lines of the second image data generated by the imaging sensor, wherein each of the plurality of scan lines comprises a plurality of pixels,
access the respective buffer,
determine an average contrast value for each pixel column in the plurality of scan lines of the respective buffer, wherein a pixel column comprises all pixels at a respective location across all of the plurality of scan lines in the respective buffer,
generate a set of average contrast values for the respective buffer comprising the average contrast value for each pixel column in the plurality of scan lines in the respective buffer, and
return both a first set of average contrast values generated from the focus buffer, and a second set of average contrast values generated from the image buffer, to the main processor for further processing.

12. The non-transitory computer-readable medium of claim 11, wherein the instructions are further configured to cause the main processor to generate both the focus buffer and the image buffer while controlling the scanning stage.

13. The non-transitory computer-readable medium of claim 11, wherein the instructions are further configured to cause the main processor to cause the secondary processor to for each of the focus buffer and the image buffer, determine an average contrast value for each pixel in the respective buffer, and wherein the average contrast value for each pixel column in the plurality of scan lines of the respective buffer is determined using the determined average contrast values for the pixels in each pixel column.

14. The non-transitory computer-readable medium of claim 13, wherein the average contrast value for each pixel is determined by averaging contrast values for that pixel and one or more pixels surrounding that pixel.

15. The non-transitory computer-readable medium of claim 11, wherein the instructions are further configured to cause the main processor to cause the secondary processor to generate the sets of average contrast values in parallel with the main processor controlling the scanning stage to generate new image data from the focusing sensor and the imaging sensor.

16. The non-transitory computer-readable medium of claim 11, wherein the instructions are further configured to cause the main processor to use the contrast value, determined from one or both of the focus buffer and the image buffer, to automatically focus an objective lens configured to move along an axis that is perpendicular to a plane of the scanning stage.

17. The non-transitory computer-readable medium of claim 11, wherein the main processor is further configured to use the contrast value, generated from one or both of the focus buffer and the image buffer, to generate a whole slide image of the sample supported on the scanning stage.

* * * * *